(12) United States Patent
Nomura

(10) Patent No.: US 10,556,395 B2
(45) Date of Patent: Feb. 11, 2020

(54) STEEL WIRE DEFORMING APPARATUS FOR BEAD CORES

(71) Applicants: FUJI SEIKO CO., LTD., Hashima-shi, Gifu-ken (JP); FUJI SHOJI CO., LTD., Hashima-shi, Gifu-ken (JP)

(72) Inventor: Shigeaki Nomura, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 333 days.

(21) Appl. No.: 15/322,644

(22) PCT Filed: Jul. 11, 2014

(86) PCT No.: PCT/JP2014/068617
§ 371 (c)(1),
(2) Date: Dec. 28, 2016

(87) PCT Pub. No.: WO2016/006109
PCT Pub. Date: Jan. 14, 2016

(65) Prior Publication Data
US 2017/0157874 A1    Jun. 8, 2017

(51) Int. Cl.
*B29D 30/48*    (2006.01)
*B21B 1/18*    (2006.01)

(52) U.S. Cl.
CPC ............... *B29D 30/48* (2013.01); *B21B 1/18* (2013.01); *B29D 2030/487* (2013.01)

(58) Field of Classification Search
CPC ...... B21F 9/00; B21F 9/007; B29D 2030/487; B29D 30/48

(Continued)

(56) References Cited

U.S. PATENT DOCUMENTS

| 2,083,350 A | * | 6/1937 | Shook | .................... | B29D 30/48 |
| | | | | | 140/92.2 |
| 4,597,157 A | * | 7/1986 | Ichikawa | ............... | B29D 30/48 |
| | | | | | 140/88 |

(Continued)

FOREIGN PATENT DOCUMENTS

| JP | S 59-187838 A | 10/1984 |
| JP | 6-286021 A | 10/1994 |

(Continued)

OTHER PUBLICATIONS

International Preliminary Report on Patentability for Application No. PCT/JP2014/068617 dated Jan. 17, 2017.

(Continued)

*Primary Examiner* — Elaine Gort
*Assistant Examiner* — Christopher B Wehrly
(74) *Attorney, Agent, or Firm* — Tarolli, Sundheim, Covell & Tummino LLP

(57) ABSTRACT

A deforming apparatus (10) for a steel wire (W) for a bead core (X) includes a deforming roller (12), a guide device (20), and a deforming amount changing device (30). The deforming roller (12) is arranged upstream of a molding drum (50), which molds the bead core (X) by winding the steel wire (W). The steel wire (W) is mounted on the deforming roller (12) in a curved manner such that the deforming roller (12) deforms the steel wire (W). The guide device (20) is arranged upstream of the deforming roller (12) and guides the steel wire (W) to the deforming roller (12). The deforming amount changing device (30) changes the amount by which the steel wire (W) is mounted on the deforming roller (12) in a curved manner by moving the guide device (20) with respect to the deforming roller (12).

5 Claims, 3 Drawing Sheets

(58) Field of Classification Search
USPC .......................................................... 72/250
See application file for complete search history.

(56) References Cited

U.S. PATENT DOCUMENTS

| | | |
|---|---|---|
| 5,228,942 A | 7/1993 | Kokui et al. |
| 2015/0059916 A1 | 3/2015 | Nomura |

FOREIGN PATENT DOCUMENTS

| | | | |
|---|---|---|---|
| JP | 2007-216614 A | 8/2007 | |
| JP | 2009-285939 A | 12/2009 | |
| WO | 2013/161031 A1 | 10/2013 | |

OTHER PUBLICATIONS

International Search Report for Application No. PCT/JP2014/068617 dated Oct. 14, 2014.
Philippine Office Action corresponding to Philippine Patent No. 1/2016/502538, dated Jun. 29, 2018.

* cited by examiner

STEEL WIRE DEFORMING APPARATUS FOR BEAD CORES

RELATED APPLICATIONS

The present invention is a U.S. National Stage under 35 USC 371 patent application, claiming priority to Serial No. PCT/JP2014/068617, filed on 11 Jul. 2014, the entirety of which is incorporated herein by reference.

TECHNICAL FIELD

The present invention relates to a deforming apparatus for a steel wire for a bead core.

BACKGROUND ART

Conventionally, to facilitate winding a steel wire around a molding drum to mold a bead core, a deforming apparatus is used to deform the steel wire in correspondence with a desired diameter of the bead core. For example, deforming apparatuses described in Patent Documents 1 and 2 each include a deforming roller on which a steel wire is mounted in a curved manner and a movement device that moves the deforming roller with respect to the molding drum.

The movement device of Patent Document 1 rotates a support plate, which supports the deforming roller. The support plate is rotated to move the deforming roller with respect to the molding drum. The movement device of Patent Document 2 moves the deforming roller to change the distance between the deforming roller and the molding drum. In this manner, by moving the deforming roller, the deforming apparatus of each of Patent Documents 1 and 2 changes the length by which a steel wire is mounted on the deforming roller in a curved manner. The greater the length of such curved-mounting with respect to the deforming roller, the greater the deforming intensity of the steel wire.

PRIOR ART DOCUMENTS

Patent Documents

Patent Document 1: Japanese Laid-Open Patent Publication No. 59-187838
Patent Document 2: Japanese Laid-Open Patent Publication No. 2007-216614

SUMMARY OF THE INVENTION

Problems that the Invention is to Solve

The deforming apparatus of Patent Document 1 moves the support plate of the movement device including the deforming roller, together with the deforming roller, with respect to the molding drum. The deforming roller of Patent Document 2 moves the deforming roller with respect to the molding drum. The locations of other components arranged between the deforming roller and the molding roller, including a guide member that guides a steel wire from the deforming roller to the molding drum, are limited to such positions that the components do not interfere with movement of the deforming roller. This restricts the design regarding the area between the deforming roller and the molding drum to a great extent.

Accordingly, it is an objective of the present invention to provide a deforming apparatus for a steel wire for a bead core capable of decreasing restrictions on the design regarding the area between a deforming roller and a molding drum.

Means for Solving the Problem

To achieve the aforementioned objective, provided is a deforming apparatus for a steel wire for a bead core including a deforming roller arranged upstream of a molding drum that molds a bead core by winding a steel wire, which is mounted on the deforming roller in a curved manner such that the deforming roller deforms the steel wire, a guide device that is arranged upstream of the deforming roller and guides the steel wire to the deforming roller, and a deforming amount changing device that changes the length by which the steel wire is mounted on the deforming roller in a curved manner by moving the guide device with respect to the deforming roller.

In the above-described configuration, the deforming intensity of the steel wire is changed by changing the length by which the steel wire is mounted in a curved manner. At this time, the deforming roller is maintained without moving with respect to the molding drum. The positions of the deforming roller and the molding drum relative to each other are thus unchanged. This restrains limitation by the deforming roller of the locations of the other components in the area between the deforming roller and the molding drum. Restrictions on the design regarding the area between the deforming roller and the molding drum are thus decreased.

Effect of the Invention

The present invention decreases restrictions on the design regarding the area between the deforming roller and the molding drum.

MODES FOR CARRYING OUT THE INVENTION

An embodiment of a deforming apparatus for a steel wire for a bead core will now be described.

Figure 1:
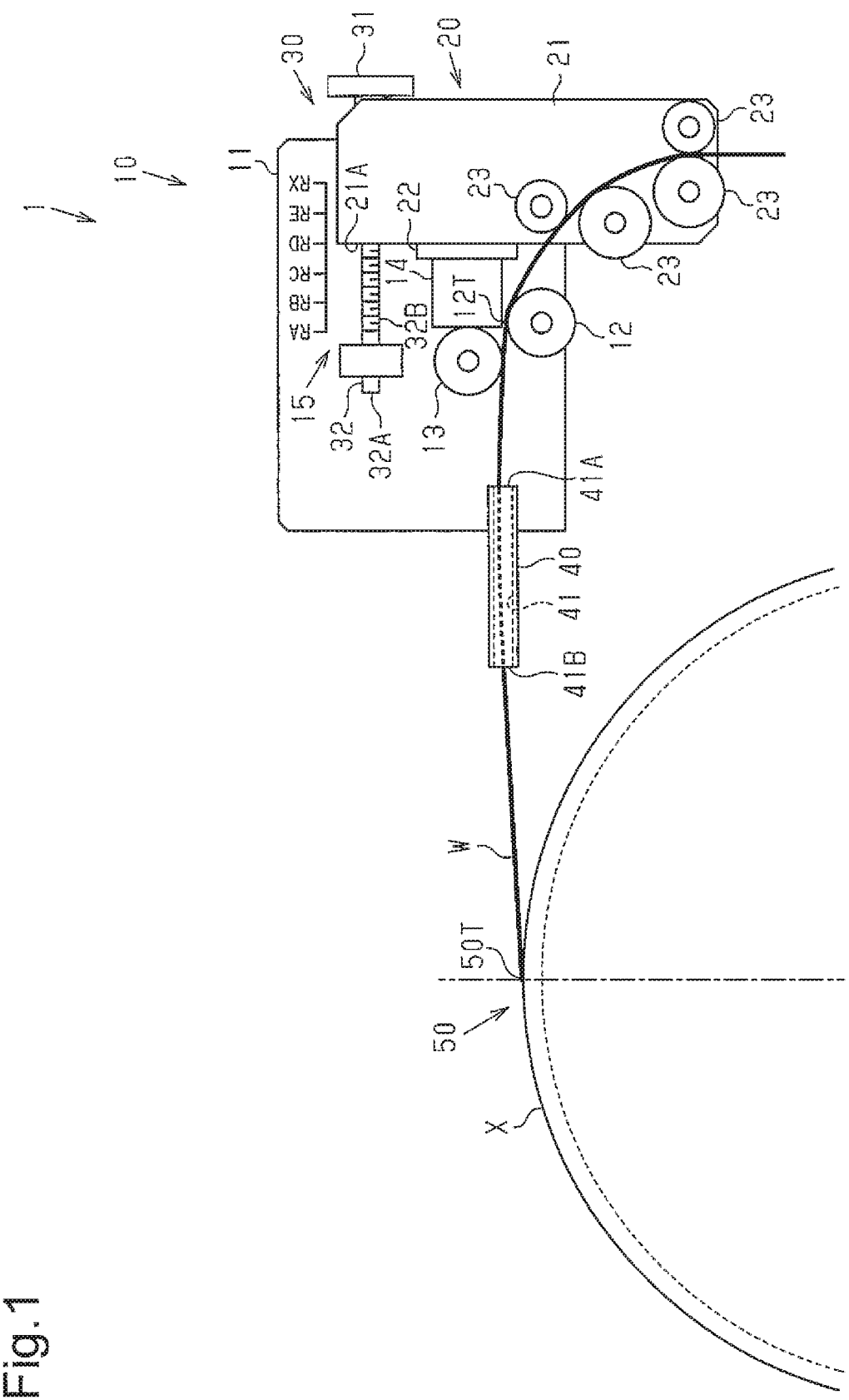
FIG. 1 is a front view showing a deforming apparatus and a molding drum of an embodiment.

As shown in FIG. 1, a bead core molding system 1, which molds a bead core X using a rubber-coated steel wire W, includes a deforming apparatus 10, a guide member 40, and a molding drum 50, which molds the bead core X by winding the steel wire W around the outer periphery of the molding drum 50.

The deforming apparatus 10 is arranged upstream of the molding drum 50, to which the steel wire W is supplied. The deforming apparatus 10 includes a support plate 11, a guide device 20, which is movably attached to the support plate 11, and a deforming amount changing device 30, by which the support plate 11 and the guide device 20 are connected to each other.

The support plate 11 supports a rotatable deforming roller 12, a rotatable pressing roller 13, and a rail 14. The pressing roller 13 is located at the opposite side to the deforming roller 12 with the steel wire W arranged between the pressing roller 13 and the deforming roller 12. The pressing roller 13 is located downstream of the deforming roller 12 and between the deforming roller 12 and the molding drum 50. The position of the pressing roller 13 relative to the deforming roller 12 is fixed.

Figure 2:
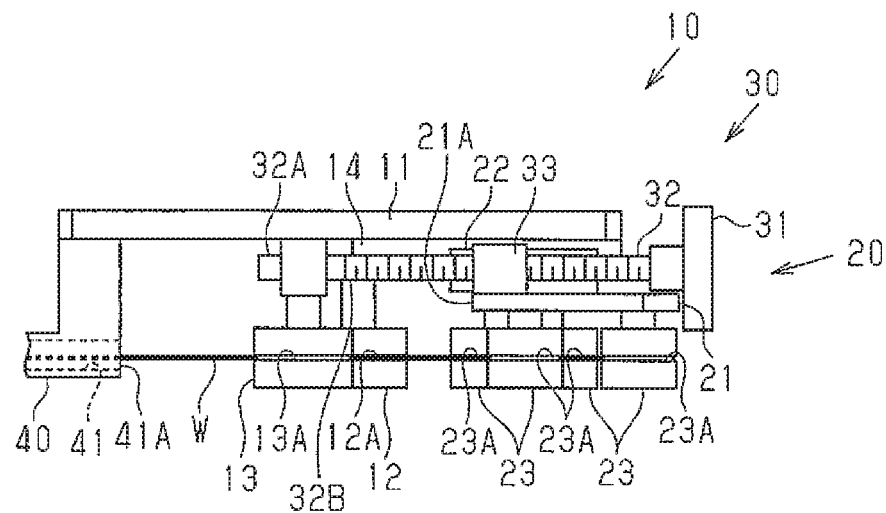
FIG. 2 is a plan view showing the deforming apparatus shown in FIG. 1.

With reference to FIG. 2, a groove 12A, on which the steel wire W is mounted in a curved manner, is formed in an outer peripheral surface of the deforming roller 12. A groove 13A, in which the steel wire W is received, is formed in an outer peripheral surface of the pressing roller 13. After having been deformed by being mounted on the deforming roller 12 in a curved manner, the steel wire W is pressed by the pressing roller 13 and introduced into an inlet port 41A of a guide hole 41 formed in the guide member 40, which is attached to the support plate 11.

As illustrated in FIG. 1, the guide hole 41 has a linear shape. An outlet port 41B of the guide hole 41 opens toward the molding drum 50. The guide hole 41 extends in the supplying direction of the steel wire W between a top portion 12T of the deforming roller 12 and a top portion 50T of the molding drum 50. The steel wire W moves out from the guide hole 41 and is then wound around the outer peripheral surface of the molding drum 50. In this manner, the bead core X is molded.

The guide device 20 includes a guide plate 21, which is movably attached to the support plate 11. The guide device 20 is located upstream of the deforming roller 12.

The guide plate 21 includes a guide 22, which is received in the rail 14 attached to a surface of the support plate 11. The rail 14 extends substantially parallel to the extending direction of the guide hole 41. By moving the guide 22 on the rail 14, the guide plate 21 is moved with respect to the support plate 11.

The guide plate 21 rotationally supports a plurality of guide rollers 23. The guide rollers 23 are located downward with respect to the deforming roller 12. Referring to FIG. 2, a groove 23A, in which the steel wire W is received, is formed in an outer peripheral surface of each of the guide rollers 23. The steel wire W is clamped by two upstream ones of the guide rollers 23. When the steel wire W is wound around the molding drum 50, the guide device 20 guides the steel wire W to the deforming roller 12 by means of the guide rollers 23.

With reference to FIG. 2, the deforming amount changing device 30 includes a wheel handle 31, which is a manipulating portion, a lead screw 32, which rotates integrally with the wheel handle 31, and a ball nut 33, which is attached around the lead screw 32.

The lead screw 32 has a distal end 32A, which is supported in a manner rotatable with respect to the support plate 11. As shown in FIG. 1, the axial direction of the lead screw 32 is parallel to the extending direction of the rail 14. The ball nut 33 is supported by the guide plate 21. An external thread 32B of the lead screw 32 is engaged with an internal thread (not shown) formed in an inner peripheral surface of the ball nut 33. The lead screw 32 and the ball nut 33 configure a conversion mechanism that converts rotation of the wheel handle 31 into linear movement. Rotation of the wheel handle 31 causes the deforming amount changing device 30 to move the guide device 20 in the axial direction of the lead screw 32 and the extending direction of the rail 14 with respect to the deforming roller 12.

Using the deforming amount changing device 30, the operator changes the deforming intensity of the steel wire W to a level corresponding to a desired diameter of the bead core X.

The support plate 11 includes a scale 15. The scale 15 represents desired diameters of the bead core X (for example, RA inch, RB inch . . . , and Rx inch). The scale 15 is set with reference to, as an indicator, an end surface 21A of the guide plate 21, which faces the deforming roller 12. Therefore, by moving the end surface 21A in correspondence with the scale 15, the operator is allowed to deform the steel wire W in a manner suitable for a tire diameter corresponding to a desired bead core X.

As the wheel handle 31 is manipulated by the operator and rotated in a certain direction, the lead screw 32 is rotated integrally with the wheel handle 31. This moves the ball nut 33 toward the deforming roller 12 in the axial direction of the lead screw 32. The guide plate 21, which supports the ball nut 33, is thus also moved on the rail 14 toward the deforming roller 12. That is, the guide plate 21 and the guide rollers 23 move toward the deforming roller 12.

As the wheel handle 31 is manipulated by the operator and rotated in the other direction, the lead screw 32 is rotated integrally with the wheel handle 31. This moves the ball nut 33 separately from the deforming roller 12 in the axial direction of the lead screw 32. The guide plate 21, which supports the ball nut 33, is thus also moved on the rail 14 separately from the deforming roller 12. That is, the guide plate 21 and the guide rollers 23 move separately from the deforming roller 12.

Operation of the deforming apparatus 10 will hereafter be described with reference to FIGS. 1 to 5.

The greater the length by which the steel wire W is mounted on the deforming roller 12 in a curved manner (hereinafter, "the curved-mounting amount"), the greater the deforming intensity of the steel wheel W by the deforming roller 12. The deforming roller 12 and the pressing roller 13 are located at constant relative positions with respect to each other. Therefore, as illustrated in FIG. 5, a position PY where the steel wire W separates from the deforming roller 12 is constant regardless of the position of the guide device 20.

Figure 5:
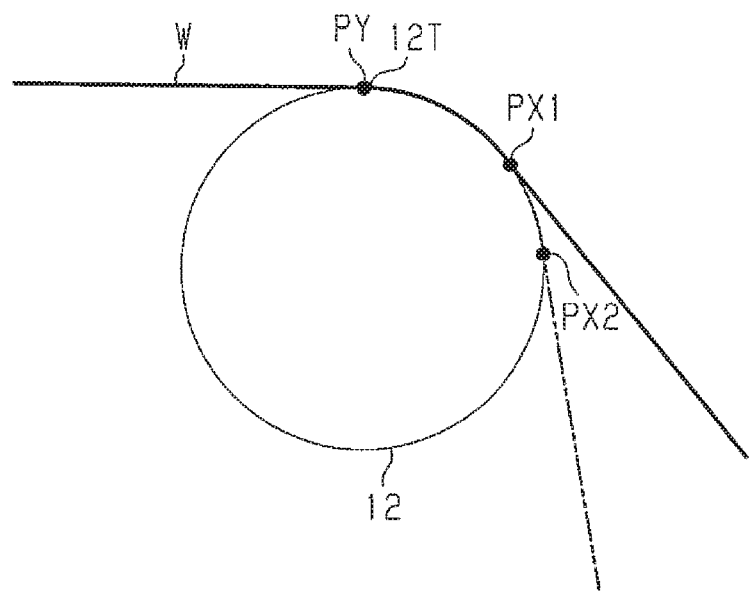
FIG. 5 is a diagram schematically representing the relationship between the deforming roller and a steel wire according to the embodiment.

With reference to FIGS. 1 and 2, when the guide device 20 is maximally spaced from the deforming roller 12, an introducing position PX1, where the steel wire W comes into contact with the deforming roller 12, is located on the position indicated on the solid line in FIG. 5 (the most downstream side of the steel wire W). This minimizes the curved-mounting amount of the steel wire W with respect to the deforming roller 12.

Figure 3:
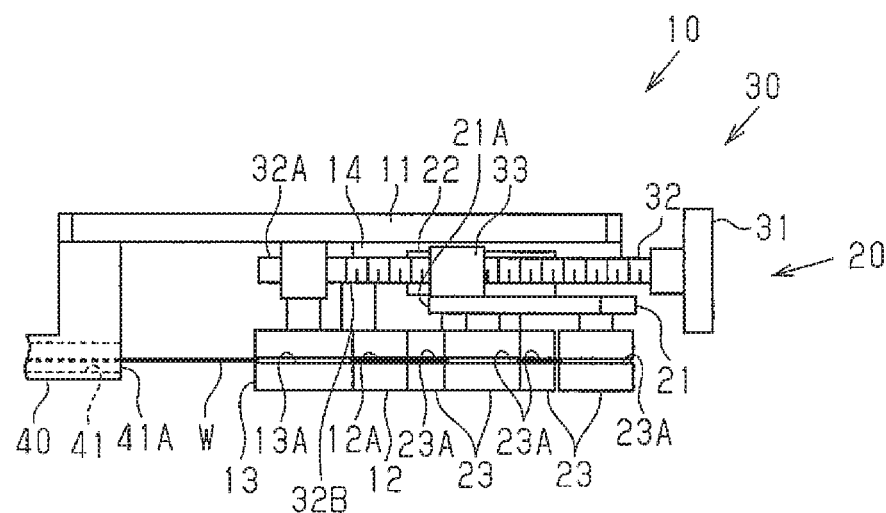
FIG. 3 is a plan view showing the deforming apparatus at the time a guide device is located closer to the molding drum than in FIG. 1.
Figure 4:
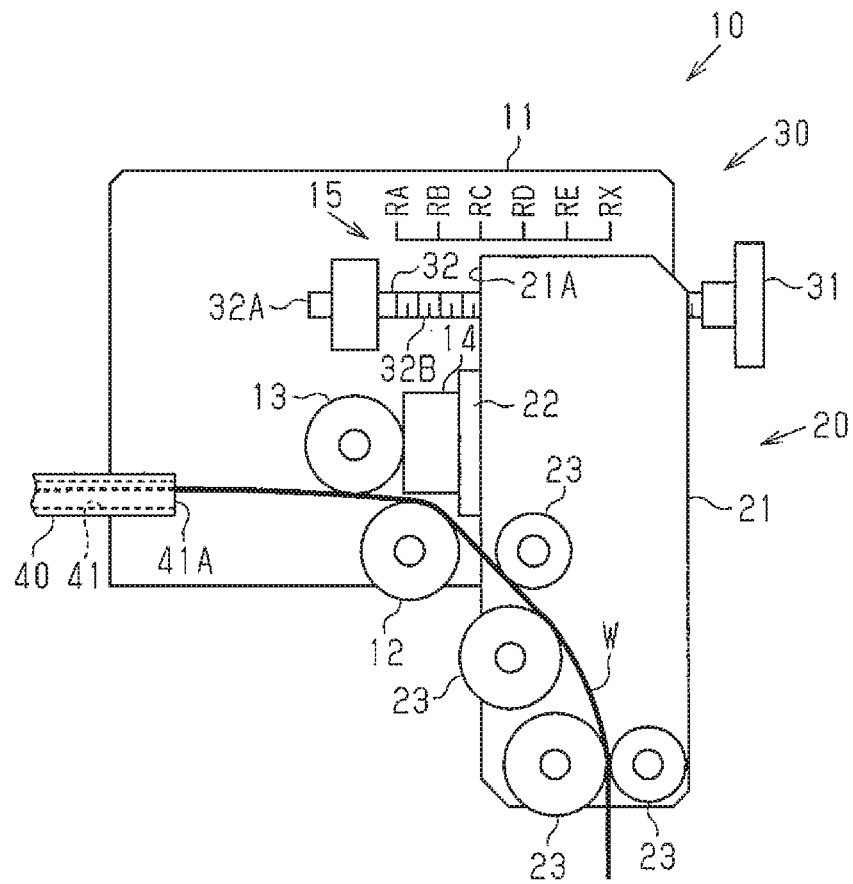
FIG. 4 is a front view showing the deforming apparatus shown in FIG. 3.

When, as illustrated in FIGS. 3 and 4, the guide device 20 is closer to the deforming roller 12 than the position represented in FIGS. 1 and 2, an introducing position PX2, where the steel wire W comes into contact with the deforming roller 12, is the position indicated on the long dashed double-short dashed line in FIG. 5, which is further upstream on the steel wire W. This increases the curved-mounting amount of the steel wire W with respect to the deforming roller 12, thus increasing the deforming intensity of the steel wire W compared to the deforming intensity in the state shown in FIGS. 1 and 2.

The conventional deforming apparatuses change the deforming intensity of the steel wire W by moving the deforming roller 12 with respect to the molding drum 50. This limits the locations of other components arranged between the deforming roller 12 and the molding drum 50, such as the guide member 40, to such locations that the components do not interfere with the deforming roller 12 regardless of where the deforming roller 12 is located. Also, the distance between the deforming roller 12 and the guide member 40 may become excessive. This may promote loosening of the steel wire W between the deforming roller 12 and the guide member 40, disadvantageously. As a result, the deforming intensity of the steel wire W may decrease or the steel wire W may twist.

In contrast, the deforming apparatus 10 of the present embodiment changes the deforming intensity of the steel wire W by moving the guide device 20. At this time, the position of the deforming roller 12 relative to the molding drum 50 is unchanged. This restrains limitation by the deforming roller 12 of the location of the guide device 40. Also, the distance between the deforming roller 12 and the guide member 40 is decreased. As a result, loosening of the steel wire W between the deforming roller 12 and the guide member 40 is restrained.

The illustrated embodiment has the advantages described below.

(1) In the deforming apparatus 10, the deforming roller 12 is maintained without moving with respect to the molding drum 50 when the deforming intensity of the steel wire W is changed. The relative positions of the deforming roller 12 and the molding drum 50 are thus unchanged. This restrains limitation by the deforming roller 12 of the locations of the other components, thus decreasing restrictions on the design regarding the area between the deforming roller and the molding drum.

(2) For example, the deforming roller 12 may be replaced by a deforming roller 12 having a different diameter to change the deforming intensity of the steel wire W. In this case, the steel wire W must be re-mounted on the replacement deforming roller 12 in a curved manner, which is troublesome. In contrast, the deforming apparatus 10 of the present embodiment changes the deforming intensity of the steel wire W by moving the guide device 20. This facilitates changing the deforming intensity of the steel wire W compared to the configuration in which the deforming roller 12 is replaced.

(3) In a case in which the pressing roller 13 is moved with respect to the deforming roller 12, excessive separation of the pressing roller 13 from the deforming roller 12 may loosen the steel wire W. Also, in a case in which the pressing roller 13 moves upward or downward, the steel wire W may not be introduced into the inlet port 41A of the guide hole 41 at the downstream side of the pressing roller 13.

In contrast, the position of the pressing roller 13 in the present embodiment is fixed with respect to the deforming roller 12. This decreases likeliness that the steel wire W will loosen between the pressing roller 13 and the deforming roller 12. Further, the pressing roller 13 is allowed to introduce the steel wire W appropriately into the inlet port 41A of the guide hole 41 and toward the molding drum 50.

(4) The deforming apparatus 10 includes the scale 15, together with desired diameters of the bead core X. This makes it easy for the operator to sense the position of the guide device 20 when moving the guide device 20.

(5) The deforming amount changing device 30 includes the wheel handle 31, which is manually operated. This facilitates precise adjustment of the position of the guide device 20, compared to a configuration in which the guide device 20 is moved using a servomotor or the like.

The illustrated embodiment may be modified to the forms described below.

The movement direction of the guide device 20 may be changed as needed. For example, the rail 14 may be attached to the support plate 11 in a longitudinally extending state such that the guide device 20 moves selectively upward and downward. In this case, the more downward the guide device 20 is located, the greater is the deforming intensity of the steel wire W. Alternatively, for example, the guide plate 21 may be rotationally attached to the support plate 11 such that the guide device 20 rotationally moves. In this case, the closer to the deforming roller 12 the lower end of the guide plate 21 is brought through rotation, the greater is the deforming intensity of the steel wire W.

The pressing roller 13 may be movable with respect to the deforming roller 12. In this case, the pressing roller 13 is moved in correspondence with the deforming intensity of the steel wire W. In this configuration, deformation of the steel wire W facilitates the appropriate introduction of the steel wire W into the inlet port 41A of the guide hole 41 and to the molding drum 50.

The scale 15 may be formed in the wheel handle 31 with an indicator formed in an end surface of the support plate 11 facing the wheel handle 31. In this case, the operator rotates the wheel handle 31 in correspondence with a diameter of the bead core X represented by the scale 15.

The scale 15 may represent the movement distance of the guide device 20. Alternatively, the scale 15 may represent the tire diameter (for example, the rim diameter) corresponding to the desired diameter of the bead core X.

The wheel handle 31 may be replaced by a handle that directly applies force by which the guide plate 21 is selectively pressed and pulled in a linear manner.

The deforming apparatus 10 may include an actuator that actuates the deforming amount changing device 30.

DESCRIPTION OF REFERENCE NUMERALS

10 . . . Deforming Apparatus, 12 . . . Deforming Roller, 13 . . . Pressing Roller, 15 . . . Scale, 20 . . . Guide Device, 20 . . . Deforming Amount Changing Device, 31 . . . Wheel Handle, 32 . . . Lead Screw, 32B . . . External Thread, 33 . . . Ball Nut, 50 . . . Molding Drum, W . . . Steel Wire.

The invention claimed is:

1. A deforming apparatus for a steel wire for a bead core, comprising:
   a molding drum that molds a bead core by winding a steel wire;
   a deforming roller that is arranged upstream of the molding drum, wherein the steel wire is mounted on the deforming roller in a curved manner such that the deforming roller deforms the steel wire;
   a guide device that is arranged upstream of the deforming roller and guides the steel wire to the deforming roller; and
   a deforming amount changing device that changes a length by which the steel wire is mounted on the deforming roller in a curved manner by moving the guide device toward or separately from the deforming roller without changing a position of the deforming roller with respect to the molding drum.

2. The deforming apparatus according to claim 1, wherein the deforming apparatus includes a pressing roller that is arranged downstream of the deforming roller and is located at a fixed position relative to the deforming roller.

3. The deforming apparatus according to claim 1, wherein the deforming apparatus includes a scale corresponding to positions of the guide device, and the scale represents a desired diameter of the bead core molded by the molding drum.

4. The deforming apparatus according to claim 3, wherein the deforming amount changing device includes a manipulating portion manually operated to move the guide device.

5. The deforming apparatus according to claim 4, wherein the manipulating portion is a wheel handle, and the deforming amount changing device includes a conversion mechanism that converts rotation of the wheel handle to linear movement and transmits the linear movement to the guide device.

* * * * *